United States Patent
Lukis et al.

(10) Patent No.: US 7,123,986 B2
(45) Date of Patent: Oct. 17, 2006

(54) FAMILY MOLDING

(75) Inventors: Lawrence J. Lukis, Wayzata, MN (US); Christopher Walls-Manning, Ramsey, MN (US); Mark R. Kubicek, Lakeville, MN (US)

(73) Assignee: The Protomold Company, Inc., Maple Plain, MN (US)

( * ) Notice: Subject to any disclaimer, the term of this patent is extended or adjusted under 35 U.S.C. 154(b) by 0 days.

(21) Appl. No.: 11/074,388

(22) Filed: Mar. 7, 2005

(65) Prior Publication Data

US 2006/0200270 A1    Sep. 7, 2006

(51) Int. Cl.
B29C 39/00    (2006.01)
(52) U.S. Cl. .................................... 700/197
(58) Field of Classification Search ............. 700/180, 700/182, 197, 200, 201; 264/453; 345/420; 705/26
See application file for complete search history.

(56) References Cited

U.S. PATENT DOCUMENTS

| | | | |
|---|---|---|---|
| 4,641,270 A | 2/1987 | Lalloz et al. ................. 364/476 |
| 5,189,626 A | 2/1993 | Colburn ................. 364/474.24 |
| 5,458,825 A | 10/1995 | Grolman et al. ............. 264/401 |
| 5,641,448 A | 6/1997 | Yeung et al. ............... 264/401 |
| 5,824,249 A * | 10/1998 | Leitch et al. ............... 264/219 |
| 5,838,328 A | 11/1998 | Roller ........................ 345/420 |
| 5,864,482 A * | 1/1999 | Hazama et al. .............. 700/95 |
| 6,096,088 A | 8/2000 | Yu et al. ........................ 703/9 |
| 6,116,895 A | 9/2000 | Johnston et al. ............. 425/195 |
| 6,173,210 B1 | 1/2001 | Bjornson et al. ............. 700/99 |
| 6,175,422 B1 | 1/2001 | Penn et al. .................. 358/1.1 |
| 6,219,055 B1 | 4/2001 | Bhargava et al. ........... 345/355 |
| 6,675,055 B1 | 1/2004 | Fischer ......................... 700/97 |
| 6,701,200 B1 | 3/2004 | Lukis et al. .................. 700/98 |
| 6,772,026 B1 * | 8/2004 | Bradbury et al. ............. 700/98 |
| 6,836,699 B1 | 12/2004 | Lukis et al. ................ 700/200 |
| 6,904,329 B1 | 6/2005 | Barto et al. |
| 6,993,401 B1 * | 1/2006 | Davis .......................... 700/100 |
| 2005/0122346 A1 * | 6/2005 | Horn .......................... 345/629 |

OTHER PUBLICATIONS

Quickparts.com press release, "Quickparts.com Announces Next Day Service For SLA Rapid Prototypes", Sep. 23, 2002.

Quickparts.com press release, "Quickparts.com Announces The Release of Online Instantaneous Quotes for WaterClear™ and High Resolution Prototypes", Nov. 23, 2001.

Quickparts.com press release, "Quickparts.com Announces The Release of Online Instantaneous Quotes for Cast Urethane Production Prototypes", Jul. 16, 2001.

(Continued)

Primary Examiner—Maria N. Von Buhr
(74) Attorney, Agent, or Firm—Shewchuk IP Services, LLC; Jeffrey D. Shewchuk (57) ABSTRACT

A customer sends CAD files for two or more parts to be molded in a family to the system. The system provides the customer with a quotation form that allows the customer to select several family-level parameters which are independent of the shape of the part, such as material and delivery date. The quotation also allows the customer to select several part-level parameters which are independent off the shape of the part, such as quantity of each part and surface finish. The system assesses the CAD files to determine savings which can be achieved by molding the parts as a family, with multiple parts in the same mold block. If possible, the system machines cavities for the multiple parts into a single mold block, passing on reductions in cost to the customer both in the quote and in the final product delivery.

24 Claims, 6 Drawing Sheets

OTHER PUBLICATIONS

Quickparts.com press release, "Quickparts.com Announces The Release of PolyQuote 1.0 Instant Quoting Technology for Build-To-Order Polyurethane Castings", May 14, 2001.

Quickparts.com press release, "Quickparts.com Announces The Release of QuickQuote™ Rev 2.0 Instant Online Quoting Engine", Mar. 5, 2001.

ASPire3D and Quickparts.com Announce Strategic Partnership, Jan. 2, 2001.

Quickparts.com press release, "Quickparts.com Announces The Release of "MyQuote" Instant Quoting Application", Oct. 16, 2000.

Quickparts.com press release, "Quickparts.com Completes Expansion To New Atlanta Facility", Jul. 7, 2000.

Quickparts.com press release, "Quickparts.com Expands On-line Instant Quoting to Include Investment Casting Patterns for the Low-Volume Custom Manufactured Metal Part Market", Apr. 11, 2000.

Quickparts.com press release, "Quickparts.com Surpasses 1000 On-line Quotes, $1 Million Quoted, In First 3 Months Of Operation", Apr. 11, 2000.

Quickparts.com press release, "QuickQuote™ Automates RP Quoting", Jan. 10, 2000.

Quickparts.com press release, "Quickparts.com Announces The Launch Of The First Web-Based E-Commerce System For Instant Quoting and Procurement of Rapid Prototyping Parts", Jan. 3, 2000.

Quickparts.com press release, "Quickparts.com Announces The Pre-Release Of The First Web-Based E-Commerce System For Instant Quoting and Procurement of Rapid Prototyping Parts", Dec. 15, 1999.

Quickparts.com press release, "Quickparts Launches QuickTool Express™, Instant Online Quotes for QuickTurn Injection Molded Parts", Jan. 10, 2005.

Quickparts.com press release, Quickparts Makes Inc. 500 List of Fastest Growing Private Companies, Nov. 9, 2004.

Quickparts.com press release, "Quickparts Named to Entrepreneur Magazine's Hot 100 Fastest Growing Entrepreneurial Companies", Jun. 10, 2004.

Quickparts.com press release, "Quickparts Offers New 'MultiQuote' Option for Rapid Prototypes & Cast Urethanes", May 10, 2004.

Quickparts.com press release, "Quickparts Offers New Real-Time Order Status and Shipment Tracking for Rapid Prototypes", Apr. 6, 2004.

Quickparts.com press release, "Quickparts.com Offers New ABS-like Stereolithography Material for Rapid Prototyping", Feb. 5, 2004.

Quickparts.com press release, "Quickparts.com Joins Solid Edge Voyager Program with MyQuote Instant Quoting Application", Oct. 16, 2003.

Quickparts.com press release, "QuickQuote Add-In for Autodesk Inventor Certified for Autodesk Inventor 6.0 and 7.0", Sep. 9, 2003.

Quickparts.com press release, "Quickparts.com Announces the Release of QuickQuote Add-in for Autodesk Inventor", Jun. 26, 2003.

Quickparts.com press release, "Resinate and Quickparts.com Announce Strategic Alliance.", Apr. 8, 2003.

* cited by examiner

FAMILY MOLDING

CROSS-REFERENCE TO RELATED APPLICATION(S)

None.

BACKGROUND OF THE INVENTION

The present invention relates to the field of mold making, and particularly to the manufacture of molds, such as for use with injection molding presses, from blocks of metal. More specifically, the present invention relates to software supported methods, systems and tools used in the design and fabrication of molds for custom plastic parts, and in presenting information to customers for the customer to make selections to help minimize the cost of the mold and running the customer's part.

Injection molding, among other types of molding techniques, is commonly utilized to produce plastic parts from molds. Companies and individuals engaged in fabricating molds are commonly referred to as "moldmakers." The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, with complex communication between the moldmaker and the customer and complex decisions made by the moldmaker regarding the construct of the mold. More recently, this process has been automated to a significant degree, to assist in transmitting information between the moldmaker and/or the moldmaker's computer system and the customer, thereby realizing significant efficiencies and corresponding price reductions in the manufacture of molds and custom molded parts. Such automation is described in U.S. patent application Ser. Nos. 11/035,648, 10/970,130, 10/325,286 (now issued as U.S. Pat. No. 6,836,699), and Ser. No. 10/056,755 (now issued as U.S. Pat. No. 6,701,200), all incorporated by reference herein. While such software and automated methods have revolutionized the moldmaking process, additional cost reductions still can be obtained by creative and non-obvious modifications.

BRIEF SUMMARY OF THE INVENTION

The present invention is a method and system of automated, custom quotation for manufacture of a mold and/or manufacture of two or more molded parts. To begin the process, a customer provides a CAD file defining the surface profile for a first part to be molded to the system. The customer is queried whether additional parts are desired to be run in a family mold. If so, the customer provides a CAD file defining the surface profile for the next part to be molded to the system. The system assesses the part surface profile (which could have any of a virtually infinite number of shapes) of the multiple parts submitted and determines whether the parts can be efficiently run in a family mold. If so, the system provides a quotation of the family mold parts and/or mold to the customer which differs from the sum of the quotations that would be provided if the parts were run separately.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation.

Numerous other minor modifications and embodiments can be devised by those skilled in the art which fall within the scope and spirit of the principles of this invention.

DETAILED DESCRIPTION

Figure 1:
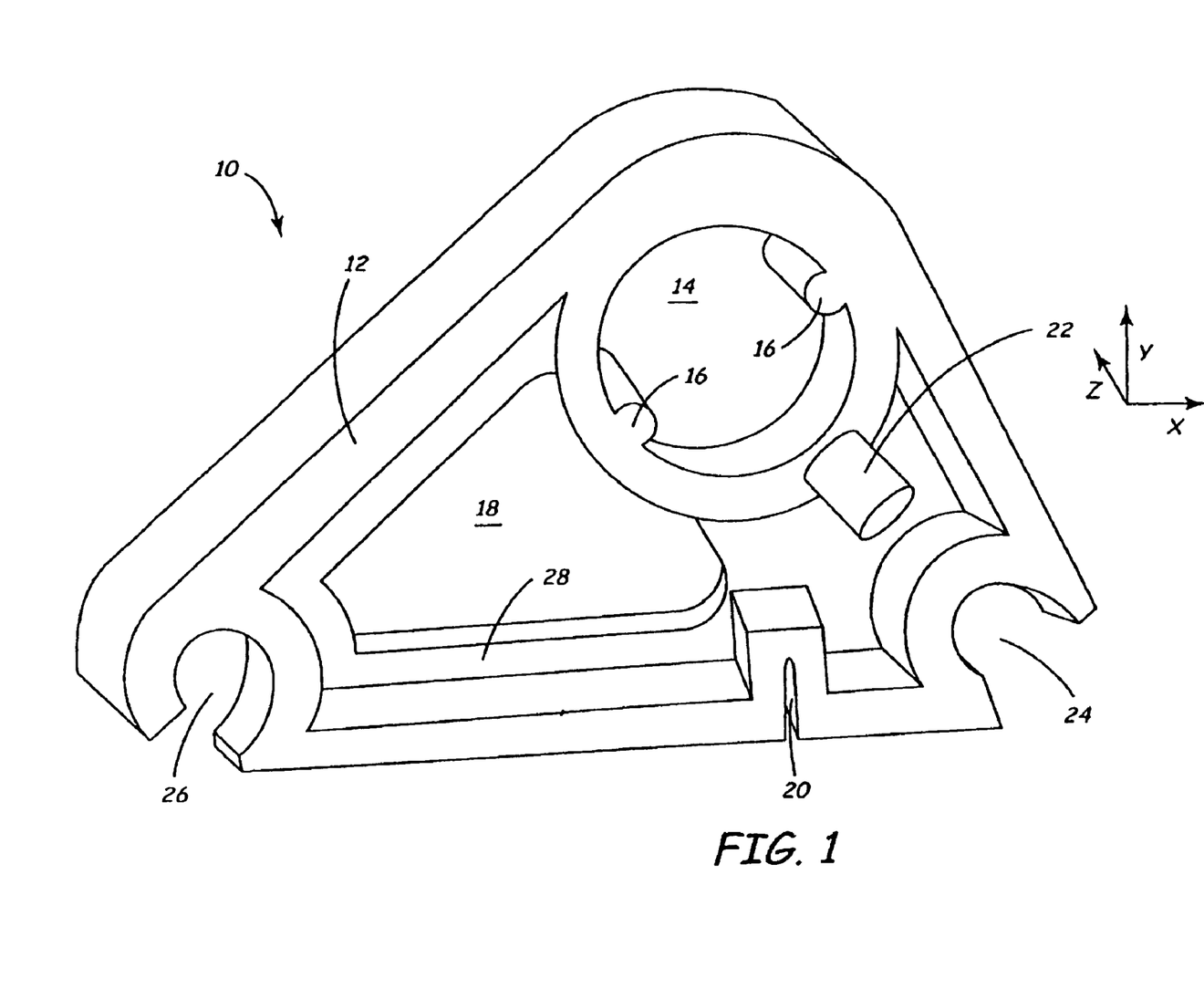
FIG. 1 is a perspective view of an exemplary "cam" part desired by a customer.

The present invention will be described with reference to an exemplary part 10 shown in FIG. 1. FIG. 1 represents a "cam" part 10 designed by the customer. In part because the cam 10 is custom-designed (i.e., not a staple article of commerce) by or for this particular customer, the cam 10 includes numerous features, none of which have commonly accepted names. For purposes of discussion, we will give names to several of these features, including a part outline flange 12, a circular opening 14 with two rotation pins 16, a non-circular opening 18, a notch 20, a rib 22, a 60° corner hole 24, a 30° corner hole 26, and a partial web 28. However, workers skilled in the art will appreciate that the customer may in fact have no name or may have a very different name for any of these features.

Figure 2:
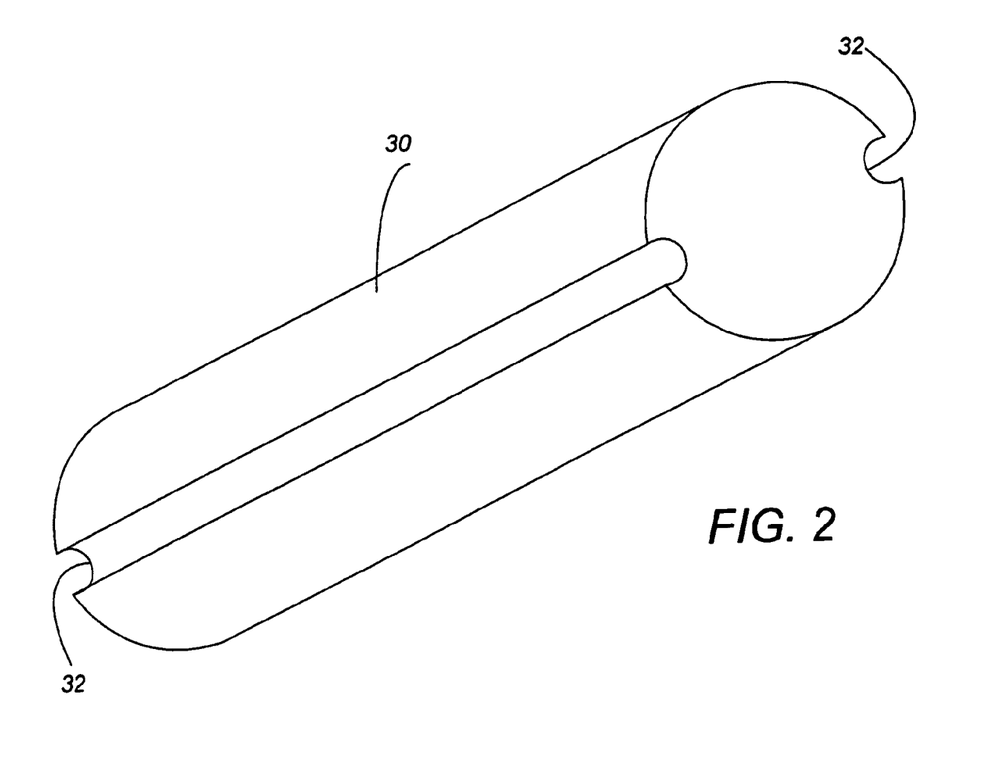
FIG. 2 is a perspective view of an exemplary "shaft" part desired by a customer to be family molded with the cam part of FIG. 1.

The customer does not intend to sell the cam 10 by itself, but rather intends to incorporate the cam 10 into the design of a machine (not shown). In this example, another exemplary part in the machine is a shaft 30 shown in FIG. 2. The outer diameter of the shaft 30 is sized to mate within the circular opening 14. The shaft 30 includes two longitudinal recesses 32 sized and spaced to mate with the rotation pins 16. In the example we will discuss, two cams 10 are used with each shaft 30, as well as with an additional rotation housing (not shown). The customer desires to have this collection or "family" of parts 10, 30 molded of the same material, and on the same time frame.

In prior art systems, the molding of each part 10, 30 is handled separately, as is the quotation process of the cost of each mold. However, certain efficiencies can be achieved by considering the parts 10, 30 in unison as a family. The present invention is intended to capture these family efficiencies.

Figure 3:
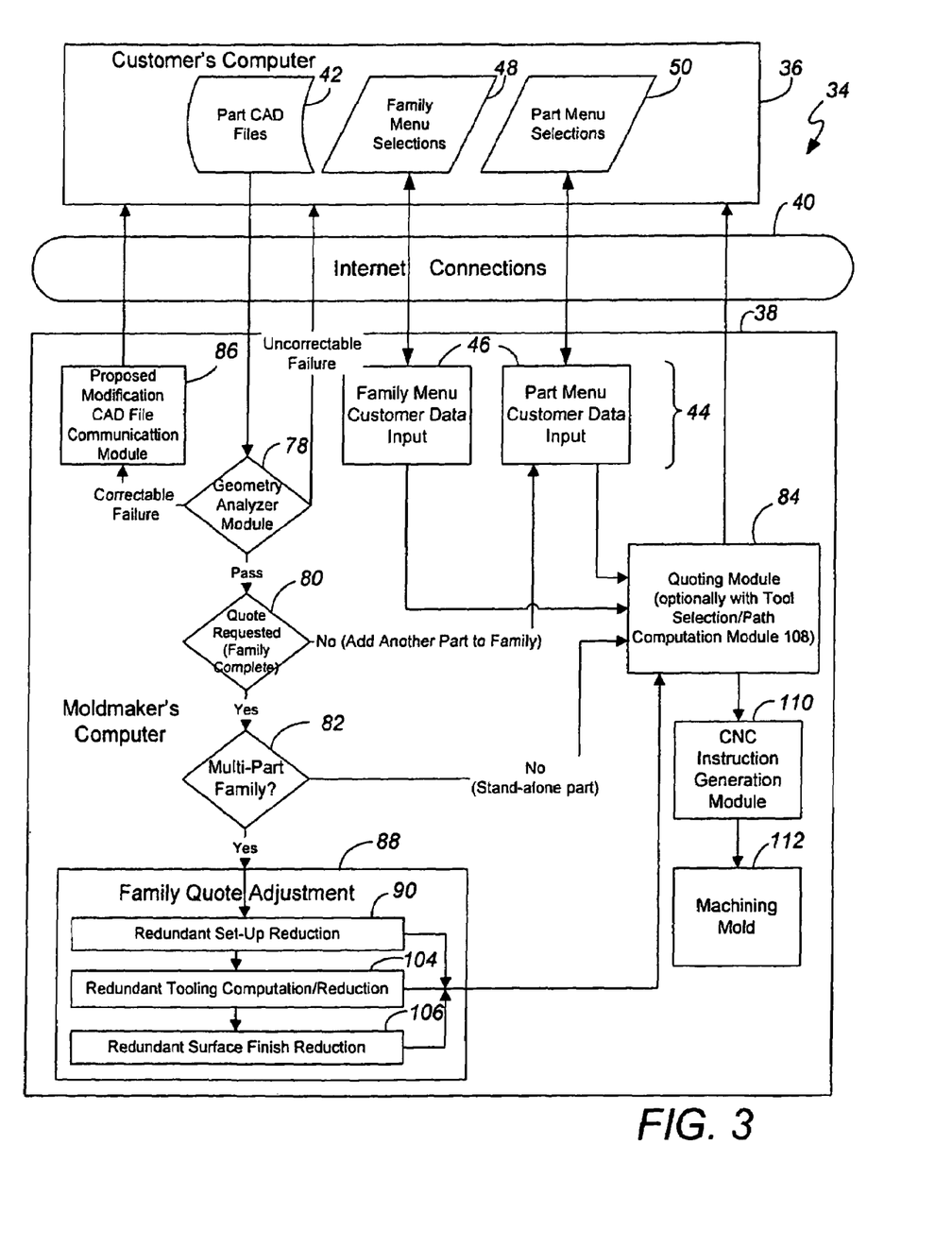
FIG. 3 is a flow chart of preferred software of the present invention.

FIG. 3 is a flow chart showing how the system 34 of the present invention is used to manufacture the customer's family of parts. The preferred process 34 takes place partially in the customer's computer 36 and partially in the moldmaker's computer 38, communicating with each other such as through the internet 40. Such communication could alternatively occur through a mailed computer disk or through a dial-up modem site. If desired, many of the software processes shown as occurring in the moldmaker's computer 38 could alternatively reside on the customer's computer 36, with the communication between the software and data files occurring entirely within the customer's computer 36. In such a case, the moldmaker provides software to the customer which provides the various functions depicted in FIG. 3 as being in the moldmaker's computer 38.

Prior to seeking a quotation for part and/or mold manufacture, the customer prepares CAD part design files 42 for each of the parts. There are several standard exchange formats currently used in the 3D CAD industry. Presently the most widely used format is the Initial Graphics Exchange Specification (IGES) standard. The present invention accepts IGES, STL or various other formats, and is compatible with all the commercial CAD products currently in use. Further, the present invention can be readily adapted to operate with future CAD file formats, provided the CAD file defines a surface profile of a part desired to be molded. A Customer Data Input module 44 includes a form 46 (shown in FIG. 4) for collecting three different types of information from the customer: the customer's selections 48 of non-CAD parameters which affect the entire family of parts, the customer's selections 50 of non-CAD parameters which are part specific, and the names of the CAD part design files 42 as stored on the customer's computer 36. If desired, the CAD program could be modified to include fields separate from the part profile data to capture and associate the family-level selections 48 and the part level selections 50 with the CAD data.

Figure 4:
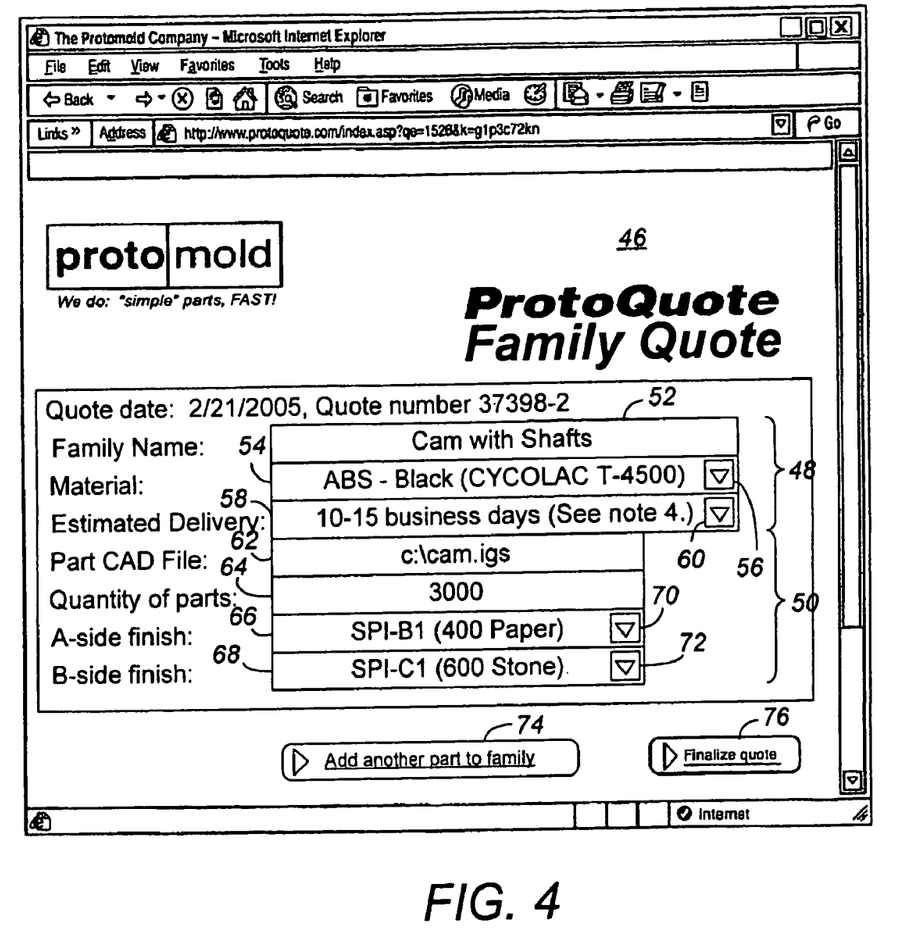
FIG. 4 is a computer screen shot of a preferred customer interface for the family mold quotation system of the present invention after inputting the first part in the family.

The preferred form 46 for data collection includes a family name box 52 for the customer to fill in a name that the moldmaker and customer can subsequently use to identify the family. In this example, the customer has typed in "Cam with Shafts" as the family name.

The preferred data collection form 46 also includes a material box 54 which is a first family-level parameter unassociated with part surface profile. The material 54 is a family-level parameter because the same material must be used for all the parts within the family.

The preferred data collection form 46 includes a button 56 in the material box 54 which can be clicked by the customer to access a drop-down menu (not shown) of offered materials.

The material or resin used for the parts 10, 30 is an integral consideration in the design process, affecting many material properties of the parts 10, 30 such as strength, flexibility, hardness, corrosion resistance, flammability, etc. Further, the cost of each plastic material or resin is subject to change due to market conditions. Accordingly, the preferred material menu provides numerous alternatives, such as the following seventy values: "Customer supplied", "ABS, Natural (LUSTRAN 433-1050)", "ABS, Black (CYCOLAC T-4500)", "ABS, Black (LUSTRAN 433-4000)", "ABS, White (LUSTRAN 248-2005)", "ABS, Black (POLYLAC PA-765)", "ABS Platable, Light Grey (LUSTRAN PG298)", "ABS Platable, Gray (CYCOLAC MG37EP)", "ABS/PC, Black (BAYBLEND FR 110-1510)", "ABS, White (LUSTRAN 248-2005)", "ABS/PC, Light Gray (BAYBLEND T85 2095)", "ABS/PC, Black (CYCOLOY C2950-701)", "ABS/PC, Natural (BAYBLEND T 45-1000)", "ABS/PC, Black (BAYBLEND T 85-1510)", "ABS/PC, Black (BAYBLEND T85 2D95)", "Acetal Copolymer, Black (CELCON M90)", "Acetal Homopolymer, Black (DELRIN 500 P BK602)", "Acetal Homopolymer, Natural (DELRIN 500P NC010)", "Acetal Homopolymer, 20% GF, Black (DELRIN 577-BK000)", "Acetal Homopolymer, Black (DELRIN 500 CL BK601)", "HDPE, Natural (HiD 9006)", "LDPE, Natural (DOW LDPE 722)", "Nylon 46, Natural (STANYL TW341)", "Nylon 6, Natural (ZYTEL 7331 F NC010)", "Nylon 6, Black (ZYTEL 7331F dyed)", "Nylon 6, Black (RTP 200A FR)", "Nylon 66, Black (ZYTEL 101L BKB009)", "Nylon 66, 13% GF, Black (ZYTEL 70G13 HSIL)", "Nylon 66, 14% GF, Black (ZYTEL 8018 HS)", "Nylon 66, 43% GF, Black (ZYTEL 74G43W BK196)", "Nylon 66 33% GF, Natural (ZYTEL 70G33HSIL)", "Nylon 66, 33% GF, Black (ZYTEL 70G33 HSIL BK031)", "Nylon 66, Natural (ZYTEL 103 HSL)", "Nylon 66, Natural (RTP 202 FR)", "PBT 30% GF, Black (VALOX 420 SEQ)", "PBT 15% GF, Black (CRASTIN SK 652 FR)", "PBT, Black (VALOX 357-1066)", "PC, Opaque/White (MAKROLON 2558-3336)", "PC, Black (LEXAN 940)", "PC, Clear (MAKROLON 2405-1112)", "PC, Clear (MAKROLON 2458-1112)", "PC, Black (MAKROLON 2405-1510)", "PC, 10% Glass, Black (MAKROLON 9415-1510)", "PC 20% GF, Natural (MAKROLON 8325-1000)", "PC 20% Glass, Black (MAKROLON 8325-1510)", "PC, clear (MAKROLON 6455-1045)", "PC, Infrared (LEXAN 121-S80362)", "PEI, Black (ULTEM 1000-7101)", "PEI, 20% GF, Black (ULTEM 2200-7301)", "PEI 30% GF, Black (ULTEM 2300-7301)", "PEI, 40% GF, Black (ULTEM 2400-7301)", "PET 30% Glass, Black (RYNITE 530-BK503)", "PET 45% Glass Mineral Flame Retardant, Black (RYNITE FR 945 BK507)", "PET 35% Glass Mica Low Warp, Black (RYNITE 935 BK505)", "PETG, Clear (EASTAR 6763)", "PMMA Clear (PLEXIGLAS V052-100)", "PP 20% Talc Filled, Natural (MAXXAM NR 218.G001-1000)", "PP, Black (MAXXAM FR 301)", "PP Copolymer, Natural (PROFAX 7531)", "PP Copolymer, Natural (PROFAX SR 857M)", "PP Homopolymer, Natural (PROFAX 6323)", "PP Homopolymer, Natural (PROFAX 6523)", "PS (GPPS), Clear (STYRON 666 Dwl)", "PS (HIPS), Black (RC 3502B)", "PS (HIPS), Natural (STYRON 498)", "PUR, Natural (ISOPLAST 202EZ)", "TPE, Natural (SANTOPRENE 211-45)", "TPE, Black (SANTOPRENE 101-73)", "TPU—Polyester, Black (TEXIN 285-1500)" and "TPU—Polyether, Natural (TEXIN 985-1000)". The term "plastic" material, as used in this application, is broadly defined and is not intended to limit the type of material which can be used in the injection molding process to polymers; in certain configurations materials (ceramics, glasses, sintered or low-melting-temperature metals, etc.) which are not polymers may be the plastic material used in the invention. In this example the customer has selected "ABS—Black (CYCOLAC T-4500)" in the material box 54 as the material to be used in quoting and molding the parts 10, 30.

Another preferred cost-affecting parameter unassociated with part surface profile is the estimated delivery date. The preferred data collection form 46 also includes a delivery date box 58. Similar to material, the estimated delivery date is a family-level parameter, because the family concept requires all the parts within the family to be simultaneously delivered to the customer on the same day. The preferred data collection form 46 includes a button 60 within the delivery date box 58 to access a drop-down menu (not shown) of delivery dates. For instance, the customer may be provided with a menu permitting selection of a delivery date of "within 5 business days" or "10–15 business days". Alternatively, additional or more specific levels of delivery date selection may be provided. The preferred quotation module includes a premium charged for rushed processing.

In this example, the customer has selected an estimated delivery time in the delivery date box 58 of "10–15 business days".

Below the boxes 52, 54, 58 for family-level parameters, the preferred data collection form 46 collects data on the part level. A first part-level data box 62 provides a location for the customer to type in the name of the CAD file 42 as stored on the customer's computer 36. If desired, the form 46 may permit the customer to "browse" for the CAD file name for the particular part. In this example, the CAD file 42 for the first part in the family is named "c:\cam.igs".

A second part-level data box 64 allows the customer to input the number of part units desired for the first named part in the molding run. In this example, two cams 10 will be used in the machine as designed by the customer, and the customer would like parts for 1500 machines, so the customer has typed in "3000" in the quantity of parts box 64 for the cam 10. The quantity of parts 64 is required to be selected as an initial parameter prior to quotation, because family molds may not require the same quantity of each part.

Third and fourth part-level data boxes 66, 68 of parameters unassociated with part surface profile are surface finishes. Similar to material and estimated delivery date, the form 46 may include button 70, 72 within the surface finish boxes 66, 68 for the customer to access a drop-down menu (not shown) of offered surface finishes. For example, the drop-down menu may include values of "T-0 (finish to Protomold discretion. Tool marks may be visible)", "SPI-C1 (600 Stone)", "SPI-B1 (400 Paper)", "T-1 (Medium bead blast finish—similar to a medium EDM finish)", "T-2 (Coarse bead blast finish—similar to a coarse EDM finish)" and "SP1-A2 (High Polish)". In this case, the customer selected "SPI-B1 (400 Paper)" in the surface finish box 66 for the A side of the cam part 10 and "SPI-C1(600 Stone)" in the surface finish box 68 for the B side of the cam 10. In the preferred data entry form 46, the customer may select any of these different menu-provided surface finishes from a different drop-down menu for each side of the mold.

In an alternative embodiment (not shown), the customer may be permitted to select different surface finishes between different faces even on the same side of the part. To avoid naming confusion over the different faces, the alternative Quoting Module 84 provides a graphical representation of each side of the part with different faces marked with indicia, such as shaded in different colors. The Quoting Module 84 then provides a drop-down menu for each colored shading on the graphical representation (i.e., "surface finish for blue face" menu, "surface finish for red face" menu, etc.) so the customer can select the surface finish applied to each colored face of the depicted cavity.

Once the customer has completed the data entry form 46 for one part, the preferred form 46 provides a button 74 for the customer to add another part to the family, and a separate button 76 for the customer to finalize the quotation. Preferably upon clicking either button 74, 76, the CAD file 42 is submitted to the Geometry Analyzer Module 78 as shown in FIG. 3. If the part 10 passes the Geometry Analyzer Module 78, and if another part 30 is to be added to the family by clicking the "Add Another Part To Family" button 74 at step 80, then a new set of part-level data entry boxes 62, 64, 66, 68 is provided to the customer. If the customer clicks on the "Finalize quote" button 76 after only one part 10 has been entered, then the part 10 is really a stand-alone part. The preferred system 34 identifies the part 10 as a stand alone part at step 82 and immediately submits the part data to the Quoting Module 84. The Quoting Module 84 for a stand alone part may be done in accordance with prior art methods or other methods subsequently devised, optionally including a Tool Selection and Tool Path Computation Module.

Figure 5:
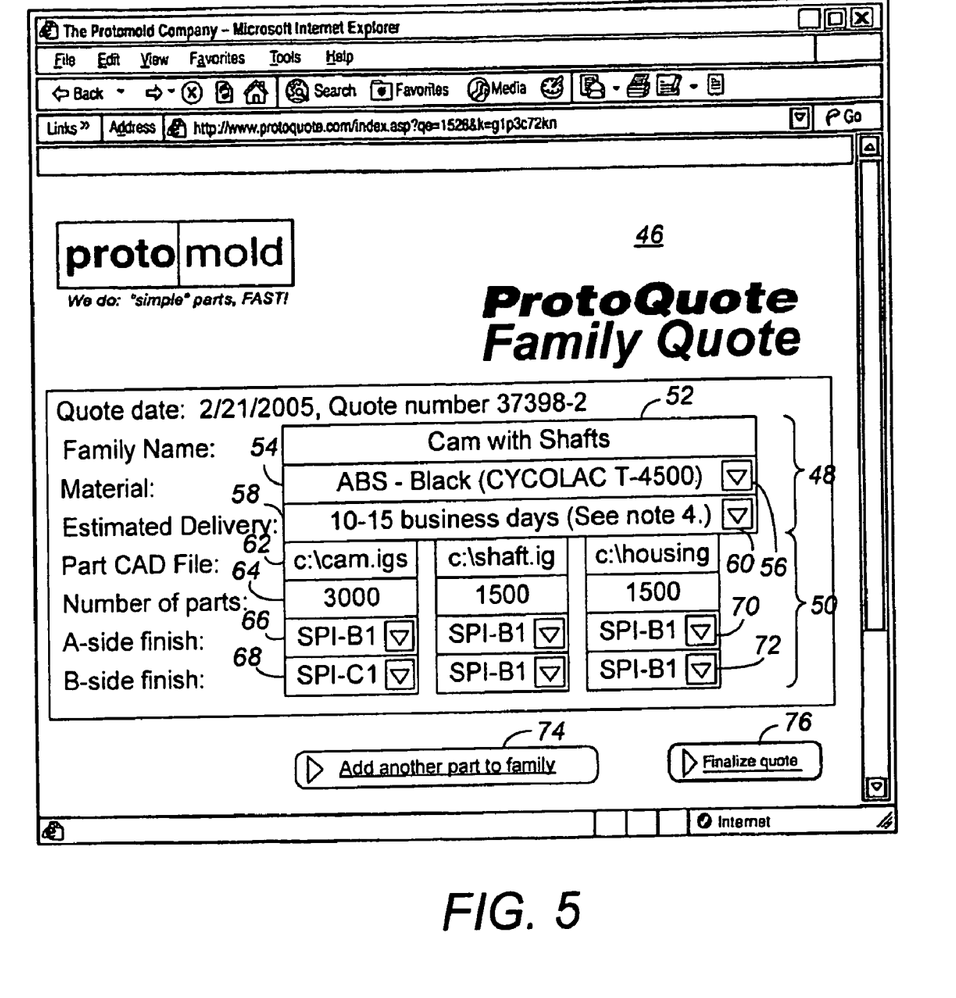
FIG. 5 is a is a computer screen shot of the preferred customer interface for the family mold quotation system of the present invention after inputting three parts in the family.

In this example, the cam 10 is only one of the parts in the family, so the customer clicked on the "Add another part to family" button 74. FIG. 5 shows the preferred form 46 after the customer has added two more parts to the family, a shaft part 30 and a housing part (not shown). Only one shaft 30 and housing part are needed in each of the 1500 machines, and the customer has thus typed "1500" in the "quantity of parts" boxes 64 for the shaft 30 and the housing.

Referring back to FIG. 3, the preferred system 34 independently assesses the CAD file 42 for each of the three parts (i.e., c:\cam.igs, c:\shaft.igs and c:\housing.igs in this example) in the Geometry Analyzer Module 78. The Geometry Analyzer Module 78 assesses the geometry of each of the customer's parts 10, 30 using a set of acceptability criteria, to thereby determine whether the mold for each part can be inexpensively manufactured. Various acceptability criteria can be used, depending upon the software and manufacturing capabilities used in automated manufacturing of the mold.

If any of the customer's CAD files 42 fails one or more acceptability criteria, this failure is communicated to the customer. If desired, the failure to meet any acceptability criteria may be communicated through a telephone call. However, preferably the program automatically generates a computer message which is transmitted to the customer, such as an e-mail. The preferred acceptability failure message indicates the nature of the failure. In the most preferred embodiment, the program includes a Proposed Modification CAD File Communication Module 86. The Proposed Modification CAD Communication Module 86 provides a graphical rendering of the failed part which distinguishes between the portions of the part geometry which pass all acceptability criteria and the portions of the part geometry which fail at least one acceptability criteria. In the preferred system, each time the customer clicks on the "Add another part to family" button 74, the Geometry Analyzer Module 78 and the Proposed Modification CAD File Communication Module 86 if necessary are run so each part is corrected and passed before the next part in the family is added. The CAD file 42 for the final part in the family is submitted to the Geometry Analyzer Module 78 (and, the Proposed Modification CAD File Communication Module 86 if necessary) when the customer clicks on the "finalize quote" button 76.

Once the "finalize quote" button 76 has been clicked for a multi-part family and all the parts have passed the acceptability criteria, then the family is assessed in a Family Quote Adjustment Module 88 to determine whether cost savings will result from treating the parts 10, 30 together as a unit or family rather than individually molding the various parts 10, 30. The first determination 90 is whether multiple parts can be run in a single, multiple cavity mold. For instance, the multiple parts 10, 30 may need to fit within a maximum projected area of a mold block, as viewed through the straight-pull axis, of 50 sq. in. (400 sq. cm). Similarly, all the multiple parts 10, 30 in a single mold block may need to be smaller than a maximum shot volume, such as a maximum volume of 18 cu. in. (200 cc). The redundant set-up reduction step 90 calculates whether multiple parts can be formed in a single mold block, and what the fewest number of mold blocks is for the family.

If a separate mold block is required for each part 10, 30, then there is no set-up reduction, and the Family Quote Adjustment Module 88 returns this information to the Quoting Module 84. In one preferred embodiment, when separate mold blocks are required for each part, each of the parts 10, 30 is quoted individually in accordance with prior art or subsequent future methods. Alternatively, and the sum of the individual quotes can be provided to the customer as a single family quote. As another option, a slight reduction may be applied to the quote as a family quote, because the fact that the same plastic material is used for all the parts reduces injection press clean-up times. As yet another option, a different slight reduction may be applied to the quote as a family quote (similar to a good customer discount), to accommodate for the fact that accounting, shipping and billing charges are likely to be less for one combined transaction than for multiple separate transactions. However, the real cost savings of the present invention involves the determination in the redundant set-up reduction step 90 that the family of parts can be run without machining and running a separate mold block for each part. In the example, the cam 10, shaft 30 and housing could all fit within a single mold block 92, so the family concept results in a significant cost savings.

Further, the preferred Family Quote Adjustment Module 88 assesses the part quantity 64 requested for each of the parts 10, 30. In this case, the customer needs twice as many cams 10 as shafts 30 and housings, which presents several different scenarios. First, three cavities may be machined into a single mold block 92 and connected with standard runners. Three thousand parts are run for each of the three parts, with fifteen hundred of the shafts 30 and housings discarded as extras. While this first approach is somewhat wasteful of plastic, it will likely still be more economical and efficient than fabricating and running three separate mold blocks. Alternatively, a gate shut-off valve 94 (shown in FIG. 6) may be added to the mold 92, to shut off the runners 96 to the shaft cavity 98 and the housing cavity 100. The redundant set-up reduction step determines whether there is enough room on the mold block 92 for the shut-off valve 94, and determines whether the savings in plastic warrants the additional cost of adding the shut-off 94. If the difference in quantities between the different parts 10, 30 is low, the cost of the shut-off valve 94 may not be warranted. As a third alternative, the redundant set-up reduction step 90 determines whether multi-cavities of fewer than all the parts 10, 30 would result in significant savings. In the example, the quantities requested for the shaft 30, housing and cam 10 could be achieved with a mold block 92 having one shaft cavity, one housing cavity and two cam cavities, then requiring only fifteen hundred injection mold shots to be run on the press. The redundant set-up reduction step 90 thus determines whether there is enough space on the block 92 for the multi-cavities (i.e., in this example, for four cavities), and assesses whether the cost difference between machining the multi-cavities of the same part 10 versus adding the shut-off valve 94 is warranted by the savings from fewer injection press runs.

Figure 6:
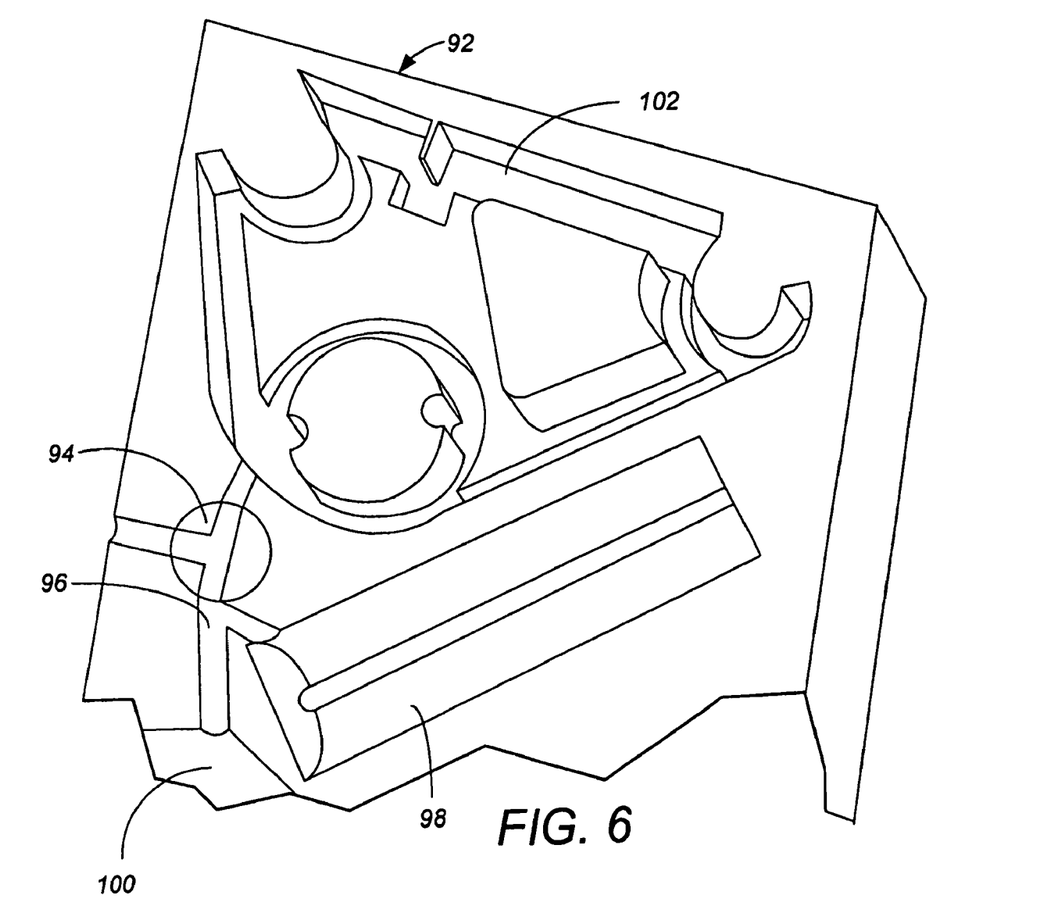
FIG. 6 is a perspective view of a portion of a mold in accordance with the present invention.

Part of the cost savings realized by the present invention 34 is attributable to mold block costs. A single mold block 92 costs less than three. A larger part of the cost savings results from set-up costs. The mold block 92 need only be positioned once in the CNC machine that will machine all three (or four) cavities 98, 100, 102. The single mold block 92 need only be positioned once on the injection mold machine. No clean-up of the injection mold machine is needed while running all three parts 10, 30.

Additional savings result from the CNC machining of the single mold block 92. When multiple cavities 98, 100, 102 are formed in a single mold block 92, the first cavity 98 does not need to be completed before machining is begun on the second cavity 100. In this example, much of the machining of the cavities 102, 98, 100 for the cam 10, shaft 30 and housing will be performed by a ¼ inch end mill (not shown). The ¼ inch end mill can be used on each of the three cavities 98, 100, 102 without requiring a tool change, and before any of the more detailed work is done on any of the cavities 98, 100, 102. Thus, by using each tool on all three cavities 98, 100, 102 as needed before switching to a subsequent tool, CNC machining costs are reduced. The redundant tooling computation/reduction step 104 in the preferred family quote adjustment 88 analyzes the tooling needed to determine whether such simultaneous machining results in lower costs to the customer.

Similar to the lower CNC machining costs, additional savings result if the different parts use the same surface finish. A single surface finishing step can be applied to all the cavities 98, 100, 102 simultaneously, rather than applying separate surface finishing steps to each of three separate molds. In this example, five of the six cavity surfaces 66, 68 are surface finished to "SPI-B1 (400 Paper)", reducing the cost incurred due to surface finishing steps. The redundant surface finish reduction step 106 in the preferred Family Quote Adjustment Module 88 analyzes the surface finishes selected by the customer to determine whether such simultaneous surface finishing results in lower costs which can be passed on to the customer.

The Family Quote Adjustment Module 88 works in conjunction with the Quoting Module 84 to deliver a summed quote for the "Cam with Shaft" family. For instance, the Quoting Module 84 may include assessment of various different costs of completing the mold and molded parts, such as (a) the machining actions which will be used to form the mold(s) (number of steps of CNC instructions, assessment of tools used and removal rates, tool change times, parting line and shut-off surface complexity, etc.); (b) the size of the parts; (c) ribbing and tightly radiused corners; (d) draft angles; (e) EDM requirements; (f) side action requirements; (g) the difficulty in applying the selected surface finishes; (h) volume and plastic material costs; and (i) flow analysis and quality of part assessment.

The Quoting Module 84 communicates the quotation to the customer, preferably through the internet 40 such as through the moldmaker's website (if real-time quotation is attained) or through a responsive e-mail to the customer's computer 36. The customer may then accept the quotation through the same medium. It is noted that the quotation provided by the Quoting Module 84 need not represent a legal offer to enter into a contract for manufacture of the mold(s) 92 or parts 10, 30. In the moldmaking field as well as in other industries, quotations are often given which are subject to final review by the company making the quotation before entering into a binding contract with an accepting customer.

In the preferred system, the Quoting Module 84 operates in conjunction with the Geometry Analyzer Module 78 to provide graphical feedback to the customer. Preferably, this feedback occurs in real time to allow the customer to redesign physical features of the parts 10, 30 (i.e., change the underlying CAD file 42 for the part 10,30) while obtaining real-time quotation information of how the redesign affects the quotation.

The Family Quoting Adjustment 88 of the present invention is also an important tool which can be used by design engineers separately from other facets of the preferred system 34, such as to compare different design alternatives. Since it is fast and easy, instant online quoting is a powerful tool for budgeting and comparing design alternatives during the development process. For instance, design engineers may weigh the costs of forming multiple parts in a machine with the same material (and thereby obtaining family mold savings) versus forming different parts with different materials. Design engineers may use online quoting several times in the design of a family of parts, and online quoting will become a very important part of their design process. If desired, the Family Quote Adjustment 88 and Quoting Module 84 may be enhanced to provide a "budget-driven" or reverse quotation for the family.

The next part of the preferred embodiment involves the Tool Selection And Tool Path Computation Module 108. The Tool Selection And Tool Path Computation Module 108 may be activated upon receipt of an accepted quotation, but more preferably operates in conjunction with the Family Quote Adjustment 88 and Quoting Module 84 as discussed earlier. The task of The Tool Selection And Tool Path Computation Module 108 is to determine what tools to use and what tool paths should be used with those tools to efficiently manufacture the mold for the part specified by the CAD file 42 of the customer.

Once the parting line and shutoff surfaces have been defined, the mold layout(s) including any side actions, any family and any multi-cavity parts has been specified, the tools have been selected, and the tool paths for the cavities have been computed, the preferred method includes a CNC Instruction Generation Module 110 which generates the detailed instructions that will be used by the CNC milling equipment to cut the mold(s) from a raw block(s) of aluminum. The final step 112 in the preferred process is machining the mold(s). The shutoff surfaces are machined into the mold block(s) 92 with the selected tools and computed machining actions and via the computer generated series of CNC machining instructions. The cavities 98, 100, 102 are likewise machined into the first and second halves of the mold(s). Locations for ejector pins are machined into the first and second halves of the mold(s) via the computer generated series of CNC machining instructions, as are runners and gates. The number of pieces 64 ordered by the customer are run in an injection mold press. The parts 10, 30 are shipped back to the customer. The customer is billed in accordance with the quotation.

The present invention allows mass production techniques to be used in the moldmaking process, even though every mold is custom designed, custom machined and different.

Although the present invention has been described with reference to preferred embodiments, workers skilled in the art will recognize that changes may be made in form and detail without departing from the spirit and scope of the invention. As one example, while the present invention has been described with relation to various patentable features being performed in separately named modules, computer programmers will recognize many equivalent options exist for naming of the modules and organization of the programming features. As another example, while the present invention as described is constrained to require straight-pull, two-piece molds or parting-line-intersecting side actions, enhancements may be made to support submersed side actions in the mold, or multi-axial assembly molds. Permitting submersed side action molds and multi-axial assembly molds will thus increase the percentage of parts that are eligible for the automated process.

The invention claimed is:

1. A method of manufacturing a mold for two or more parts, the method comprising:
   receiving customer part data comprising a CAD file for a first part to be molded, the CAD file defining a first part surface profile;
   receiving customer part data comprising a CAD file for a second part to be molded, the CAD file defining a second part surface profile;
   automatically determining that the first part and the second part are eligible for molding in a family mold, the automatic determining requiring both the first part and the second part to be molded of the same material and requiring that a cavity for the first part and a cavity for the second part fit within a single mold block size;
   machining, within a single mold block, the cavity for the first part based upon the CAD file defining the first part surface profile and the cavity for the second part based upon the CAD file defining the second part surface profile; and
   running the single mold block in an injection mold press to manufacture the first part and the second part.

2. The method of claim 1, further comprising:
   automatically determining that the first part is to be run in a different quantity from the second part; and
   adding a shut-off valve to the single mold block.

3. The method of claim 1, further comprising:
   automatically determining that the first part is to be run in a higher quantity than the second part; and
   machining a second cavity for the first part in the single mold block, such that the single mold block comprises at least two cavities for the first part and a cavity for the second part.

4. The method of claim 1, further comprising:
   machining the cavity for the first part with a first tool;
   prior to completion of machining the cavity for the first part, machining the cavity for the second part with the first tool without a tool change.

5. A method of custom quotation for manufacture of a mold and/or manufacture of two or more parts, the method comprising:
   receiving customer part data comprising a CAD file for a first part to be molded, the CAD file defining a first part surface profile;
   receiving customer part data comprising a CAD file for a second part to be molded, the CAD file defining a second part surface profile;
   assessing cost-affecting parameters of mold manufacture and/or part manufacture determined by the first part surface profile and by the second part surface, the assessment including an automated determination that the first part and the second part are eligible for molding in a family mold; and
   generating a quotation for mold manufacture and/or part manufacture for the first part, for the second part or for both the first and second parts, the quotation based at least in part upon the cost-affecting parameters determined by the first part surface profile, the second part surface profile, or both the first and second part surface profiles, the quotation including an adjustment if the first part and the second part are eligible for molding in the family mold differing.

6. The method of claim 5, wherein the customer part data for the first part to be molded comprises a customer indication of material for molding of the first part, wherein the customer part data for the second part to be molded comprises a customer indication of material for molding of the second part, and wherein the automated determination that the first part and the second part are eligible for molding in a family mold comprises an automated verification that the first part and the second part are to be molded from the same material.

7. The method of claim 6, further comprising:
providing the customer with a menu of available injection moldable plastics from which the customer makes a selection of plastic for the parts, and wherein the quotation varies based upon which plastic the customer selects for the parts.

8. The method of claim 5, wherein the automated determination that the first part and the second part are eligible for molding in a family mold comprises an automated assessment of whether a cavity for the first part and a cavity for the second part fit into a standard mold block size.

9. The method of claim 5, wherein the customer part data for the first part to be molded comprises a customer indication of quantity for molding of the first part, wherein the customer part data for the second part to be molded comprises a customer indication of quantity for molding of the second part, and wherein the automated determination that the first part and the second part are eligible for molding in a family mold comprises a verification that the first part is to be run in the same quantity as the second part.

10. The method of claim 5, further comprising:
determining that the first part is to be run in a different quantity from the second part; and
adding a cost of a gate shut-off valve to the quotation.

11. The method of claim 5, further comprising:
providing the customer with an opportunity to include more than two parts in the family mold quotation, the assessment including an automated determination that all the customer included parts are eligible for molding in a single family mold.

12. The method of claim 5, wherein generating the quotation comprises assessing manufacturing set-up costs and adjusting the quotation when manufacturing set-up costs are shared by the two or more parts.

13. The method of claim 5, further comprising:
communicating the quotation to the customer via computer.

14. The method of claim 5, wherein generating the quotation for molding the first part and the second part in the family mold comprises:
identifying tooling for machining a cavity for the first part and for machining a cavity for the second part;
assessing whether one or more tools identified for machining the cavity for the first part are identical to one or more tools identified for machining the cavity for the second part: and
if identical tooling is identified, adjusting the quotation for reduced tool change costs.

15. The method of claim 5, wherein generating the quotation for molding the first part and the second part in the family mold comprises:
identifying surfaces finishes for a cavity the first part and a cavity for the second part; assessing whether at least one identified surface finish for the cavity for the first part is identical to at least one identified surface finish for the cavity for the second part; and
if at least one identical surface finish is present, adjusting the quotation for reduced surface finishing costs.

16. The method of claim 5, further comprising:
upon acceptance of the quotation by the customer, machining multiple cavities into a mold block corresponding in shape to the parts to be molded as defined by the customer's CAD files.

17. The method of claim 16, wherein a first tool is used on a first cavity for the first part and on a second cavity for the second part prior to using a second tool on the first cavity for the first part.

18. A method of custom quotation for manufacture of a mold and/or manufacture of two or more parts, the method comprising:
receiving customer part data comprising a CAD file for a first part to be molded, the CAD file defining a first part surface profile;
automatically querying the customer as to whether the first part is to be molded as part of a family;
if the customer responds that the first part is to be molded as part of a family, receiving customer part data comprising a CAD file for a second part to be molded, the CAD file defining a second part surface profile;
assessing cost-affecting parameters of mold manufacture and/or part manufacture determined by the first part surface profile and by the second part surface profile; and
generating a quotation for mold manufacture and/or part manufacture for the first part, for the second part or for both the first and second parts, the quotation based at least in part upon the cost-affecting parameters determined by the first part surface profile, the second part surface profile, or both the first and second part surface profiles, the quotation including an adjustment if the customer has responded that the first part and the second part are to be molded as part of a family.

19. A computer readable medium storing a computer program for custom quotation for manufacture of an injection mold and/or manufacture of two or more injection molded parts in a family, the computer program comprising:
an input dedicated for receiving a customer's CAD files, each CAD file defining a shape of a part to be molded;
computer code for analyzing the customer's CAD files to determine at least one cost-affecting parameter of injection mold manufacture, the computer code also reviewing information including material of the part to be molded to determine whether the part is eligible for running in a family mold with one or more additional other parts; and
an output providing a dollar value quotation for injection mold manufacture and/or part manufacture which includes costs associated with machining cavities into an injection mold block, the cavities corresponding in shape to the parts to be injection molded, the output based in part on the cost-affecting parameter of injection mold manufacture as determined by the computer code analysis of the customer's CAD files, the dollar value quotation being adjusted for reduced costs associated with running multiple parts in the same family mold when the computer code has determined that the part is eligible for running in the family mold with other additional parts.

20. The computer readable medium of claim 19, wherein the computer program provides the customer with a menu of available injection moldable plastics for a first part to be molded, and automatically requires all other additional parts to be molded in the same family with the first part to be molded of the material selected by the customer for the first part.

21. The computer readable medium of claim 19, wherein the computer code determines whether a cavity for the first part and a cavity for an additional part to be molded in the same family fit into a standard mold block size.

22. The computer readable medium of claim 19, wherein the computer program further comprises an input for the customer to identify the number of parts to be run for the first part and the number of parts to be run for an additional part to be molded in the same family, and wherein, if different quantities are selected, the computer code increases the dollar value quotation to add a cost of a gate shut-off valve to the dollar value quotation.

23. The computer readable medium of claim 19, wherein the reduced costs associated with running multiple parts in the same family mold are set up costs associated with running an injection mold press.

24. The computer readable medium of claim 19, wherein the reduced costs associated with running multiple parts in the same family mold are tool change costs associated with machining a cavity for the first part and a cavity for an additional part in one mold block.

* * * * *

UNITED STATES PATENT AND TRADEMARK OFFICE
CERTIFICATE OF CORRECTION

PATENT NO. : 7,123,986 B2  Page 1 of 1
APPLICATION NO. : 11/074388
DATED : October 17, 2006
INVENTOR(S) : Lawrence J. Lukis et al.

It is certified that error appears in the above-identified patent and that said Letters Patent is hereby corrected as shown below:

At Col. 10, line 57, delete "differing".

Signed and Sealed this

Nineteenth Day of December, 2006

JON W. DUDAS
*Director of the United States Patent and Trademark Office*